United States Patent
Ihara et al.

(10) Patent No.: US 7,369,942 B2
(45) Date of Patent: May 6, 2008

(54) VEHICLE TRAVELING STATE DETERMINING APPARATUS

(75) Inventors: Toru Ihara, Tokyo (JP); Keiichi Yamamoto, Tokyo (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 514 days.

(21) Appl. No.: 11/076,435

(22) Filed: Mar. 9, 2005

(65) Prior Publication Data

US 2005/0203706 A1    Sep. 15, 2005

(30) Foreign Application Priority Data

Mar. 12, 2004    (JP) .............................. 2004-071331

(51) Int. Cl.
  *G06F 17/10* (2006.01)
  *G06K 9/00* (2006.01)
(52) U.S. Cl. ..................... 701/301; 701/300; 701/1; 348/118; 382/104; 382/107; 180/167; 180/168; 180/169; 180/272; 280/734; 280/735
(58) Field of Classification Search ................ 701/300, 701/301; 348/118; 382/104, 107; 180/167–169, 180/272; 280/734, 735
See application file for complete search history.

(56) References Cited

U.S. PATENT DOCUMENTS 4,471,825 A * 9/1984 Kuhn et al. ............. 152/209.18
4,482,136 A * 11/1984 Wolf et al. .................. 267/152
4,496,938 A    1/1985 Seko et al.
5,172,317 A * 12/1992 Asanuma et al. ............. 701/28
5,648,755 A    7/1997 Yagihashi
5,685,925 A * 11/1997 Riquier et al. ............... 152/157

(Continued)

FOREIGN PATENT DOCUMENTS

DE    3613669 A * 10/1987

(Continued)

OTHER PUBLICATIONS

Tracking highly maneuverable targets with unknown behavior,Schell, C.; Linder, S.P.; Zeider, J.R.; Proceedings of the IEEE, vol. 92, Issue 3, Mar. 2004 pp. 558-574, Digital Object Identifier 10.1109/JPROC.2003.823151.*

(Continued)

*Primary Examiner*—Cuong Nguyen
(74) *Attorney, Agent, or Firm*—Rossi, Kimms & McDowell LLP (57) ABSTRACT

The present invention provides a vehicle traveling state determining apparatus including a camera which picks up an image of a road surface in a direction in which a vehicle is traveling, and zigzag state detecting section for determining a zigzag amount on the basis of the road surface image picked up using the camera, wherein the zigzag state detecting section is comprised of speed vector calculating section for calculating a speed vector of the road surface image by comparing a last road surface image picked up using the camera with a current road surface image picked up using the camera, and determining section for determining whether or not the vehicle is traveling in a zigzag line on the basis of the speed vector of the road surface image calculated by the speed vector detecting section.

6 Claims, 6 Drawing Sheets

U.S. PATENT DOCUMENTS

| | | | |
|---|---|---|---|
| 5,694,116 | A | 12/1997 | Kojima |
| 5,745,031 | A | 4/1998 | Yamamoto |
| 5,815,070 | A | 9/1998 | Yoshikawa |
| 5,974,792 | A * | 11/1999 | Isobe .......................... 60/278 |
| 6,023,227 | A | 2/2000 | Yanko et al. |
| 6,184,781 | B1 * | 2/2001 | Ramakesavan ............. 340/435 |
| 6,218,947 | B1 | 4/2001 | Sutherland |
| 6,366,207 | B1 | 4/2002 | Murphy |
| 6,523,591 | B1 * | 2/2003 | Billieres et al. ............ 152/548 |
| 6,831,591 | B2 | 12/2004 | Horibe |
| 6,845,172 | B2 | 1/2005 | Furusho |
| 6,879,890 | B2 | 4/2005 | Matsumoto et al. |
| 6,925,206 | B2 | 8/2005 | Akutagawa |
| 6,950,027 | B2 | 9/2005 | Banas |
| 6,973,380 | B2 | 12/2005 | Tange et al. |
| 7,006,667 | B2 | 2/2006 | Akutagawa |
| 7,054,723 | B2 | 5/2006 | Seto et al. |
| 7,084,772 | B2 | 8/2006 | Oyama |
| 7,204,130 | B2 * | 4/2007 | Koram et al. ................... 73/73 |
| 2005/0203706 | A1 * | 9/2005 | Ihara et al. ................. 701/301 |
| 2005/0232464 | A1 | 10/2005 | Ihara et al. |

FOREIGN PATENT DOCUMENTS

| | | |
|---|---|---|
| DE | 20016384 U1 * | 2/2001 |
| DE | 59410156 G * | 8/2002 |
| EP | 73299 B * | 1/1986 |
| EP | 73966 B * | 1/1986 |
| EP | 354562 A2 * | 2/1990 |
| EP | 354562 B1 * | 6/1997 |
| EP | 1053111 B1 * | 1/2002 |
| EP | 1802496 A1 * | 7/2007 |
| JP | 6-274786 A | 9/1994 |
| JP | 2830475 B2 | 9/1998 |
| JP | 10334393 A * | 12/1998 |
| JP | 11013038 A * | 1/1999 |
| JP | 11230273 A * | 8/1999 |
| JP | 3039327 B2 | 3/2000 |
| JP | 2001289029 A * | 10/2001 |
| JP | 2002325347 A * | 11/2002 |
| JP | 3635403 B2 * | 4/2005 |
| JP | 2005146862 A * | 6/2005 |
| JP | 2005258936 A * | 9/2005 |
| KR | 490164 B * | 5/2005 |
| WO | WO95/18433 A1 | 7/1995 |
| WO | WO 9925572 A1 * | 5/1999 |
| WO | WO 2006042248 A1 * | 4/2006 |

OTHER PUBLICATIONS

The dynamic window approach to collision avoidance, Fox, D.; Burgard, W.; Thrun, S. Robotics & Automation Magazine, IEEE□□vol. 4, Issue 1, Mar. 1997 pp. 23-33, Digital Object Identifier 10.1109/100.580977.*

A co-evolution approach to sensor placement and control design for robot obstacle avoidanceWang, X.; Yang, S.X.; Weiren Shi; Meng, M.Q.-H.;Information Acquisition, 2004. Proceedings. International Conference onJun. 21-25, 2004 pp. 107-112, Digital Object Identifier 10.1109/ICIA.2004.1373331.*

Understanding the motions of tools and vehicles, Duric, Z.; Rivlin, E.; Rosenfeld, A.; Computer Vision, 1998. Sixth International Conference on, Jan. 4-7, 1998 pp. 925-932, Digital Object Identifier 10.1109/ICCV.1998.710827.*

A "constrain and move" approach to distributed object manipulation, Ahmadabadi, M.N.; Nakano, E.; Robotics and Automation, IEEE Transactions on, vol. 17, Issue 2, Apr. 2001 pp. 157-172, Digital Object Identifier 10.1109/70.928561.*

The active recovery of 3D motion trajectories and their use in prediction, Bradshaw, K.J.; Reid, I.D.; Murray, D.W.; Pattern Analysis and Machine Intelligence, IEEE Transactions on, vol. 19, Issue 3, Mar. 1997 pp. 219-234 Digital Object Identifier 10.1109/34.584099.*

The use of optical flow for road navigation, Giachetti, A.; Campani, M.; Torre, V.; Robotics and Automation, IEEE Transactions on, vol. 14, Issue 1, Feb. 1998 pp. 34-48, Digital Object Identifier 10.1109/70.660838.*

Vehicle detection by means of stereo vision-based obstacles features extraction and monocular pattern analysis, Toulminet, G.; Bertozzi, M.; Mousset, S.; Bensrhair, A.; Broggi, A.; Image Processing, IEEE Transactions on, vol. 15, Issue 8, Aug. 2006 pp. 2364-2375, Digitial Object Identifier 10.1109/TIP.2006.875174.*

A decision network based frame-work for visual off-road path detection problem, Broggi, A.; Caraffi, C.; Cattani, S.; Fedriga, R.I.; Intelligent Transportation Systems Conference, 2006. ITSC '06. IEEE, 2006 pp. 951-956, Digital Object Identifier 10.1109/ITSC.2006.1706867.*

Multilevel- and neural-network-based stereo-matching method for real-time obstacle detection using linear cameras, Ruichek, Y.; Intelligent Transportation Systems, IEEE Transactions on, vol. 6, Issue 1, Mar. 2005 pp. 54-62, Digital Object Identifier 10.1109/TITS.2004.838185.*

A voting stereo matching method for real-time obstacle detection, Hariti, M.; Ruichek, Y.; Koukam, A.; Robotics and Automation, 2003. Proceedings. ICRA '03. IEEE International Conference on, vol. 2, Sep. 14-19, 2003 pp. 1700-1704 vol. 2 □□.*

A fast stereo matching method for real time vehicle front perception with linear cameras, Hariti, M.; Ruichek, Y.; Koukam, A.; Intelligent Vehicles Symposium, 2003. Proceedings. IEEE, Jun. 9-11, 2003 pp. 247-252, Digital Object Identifier 10.1109/IVS.2003.1212917.*

Y. Ninomiya et al., "A real-time vision for intelligent vehicles", IEEE, Sep. 25-26, 1995, Proceedings of the Intelligent Vehicles 95 Symposium; pp. 315-320.

German Office Action issued in corresponding German Patent Application No. 10 2005 011 688.4-53, dated May 24, 2007.

Chinese Office Action issued for counterpart Chinese Patent Application No. 200510054746.1, dated Feb. 9, 2007.

Kitajima, H. et al., "Prediction of Automobile Driver Sleepiness," Transactions of the Japan Society of Mechanical Engineers, Sep. 1997, No. 96-1780, pp. 93-100.

* cited by examiner

FIG. 6  Edge image

Current image
FIG. 7A

Last image
FIG. 7B

FIG. 7C

Optical flow image

Optical flow image for perfectly rectilinear traveling

Differential optical flow image

FIG. 8A  FIG. 8B  FIG. 8C

Optical flow image

VEHICLE TRAVELING STATE DETERMINING APPARATUS

CROSS-REFERENCE TO RELATED APPLICATIONS

This application is based upon and claims the benefit of priority from prior Japanese Patent Application No. 2004-071331, filed Mar. 12, 2004, the entire contents of which are incorporated herein by reference.

BACKGROUND OF THE INVENTION

1. Field of the Invention

The present invention relates to a vehicle traveling state determining apparatus that can determine whether or not, for example, a driver's awoken state is impeded during driving, so that the driver is falling asleep at the wheel.

2. Description of the Related Art

In recent years, with the development of a road network and an increase in leisure hours, there have been an increasing number of opportunities for driving a car. The driver is desired to be always physically and mentally stable during driving. However, the driver may drive a car while conscious of his or her bad physical condition. In this case, during long continuous driving, the driver's fatigue keeps piling up and his or her concentration lowers. Consequently, the driver's awoken state may be impeded and the driver may become sleepy.

To prevent this, a vehicle is provided with a camera that picks up a frontal image that allows white lines on roads to be recognized to determine whether or not the vehicle is traveling in a zigzag line. This system thus determines whether or not the driver is falling asleep at the wheel. If the result of the determination is affirmative, the system gives a warning (for example, Japanese Patent No. 3039327).

In this document, the apparatus picks up images of traveling zone partitioning lines and on the basis of the images, determines whether or not the vehicle is traveling in a zigzag line. However, there is another method of recognizing white lines on the opposite sides of a road to determine whether or not the vehicle is traveling in a zigzag line. However, with this method, it is impossible to determine whether or not the vehicle is traveling in a zigzag line if the entire road surface is covered with snow or if even without snow, there are no white lines on the opposite sides of the road.

BRIEF SUMMARY OF THE INVENTION

It is an object of the present invention to provide a vehicle traveling state determining apparatus that can determine whether or not a vehicle is traveling in a zigzag line, even without any white lines.

According to one aspect of the present invention, there is provided a vehicle traveling state determining apparatus comprising a camera which picks up an image of a road surface in a direction in which a vehicle is traveling; and zigzag state detecting section for determining a zigzag amount on the basis of the road surface image picked up using the camera, wherein the zigzag state detecting section is comprised of:

speed vector calculating section for calculating a speed vector of the road surface image by comparing a last road surface image picked up using the camera with a current road surface image picked up using the camera; and determining section configured to determine whether or not the vehicle is traveling in a zigzag line on the basis of the speed vector of the road surface image calculated by the speed vector detecting section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
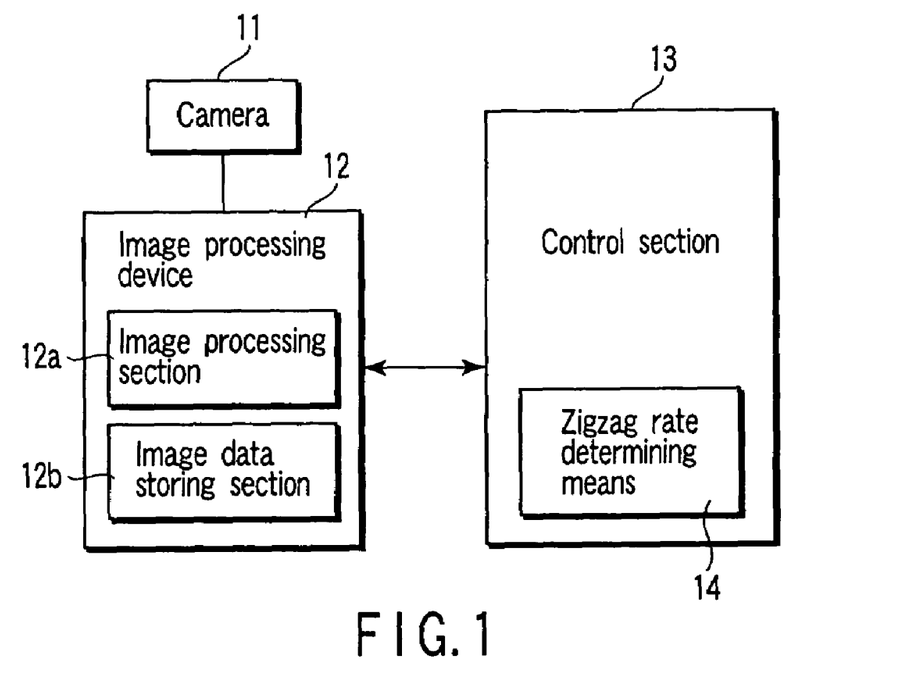
FIG. 1 is a block diagram illustrating a vehicle traveling state determining apparatus according to an embodiment of the present invention.

An embodiment of the present invention will be described with reference to the drawings. FIG. 1 is a block diagram showing a vehicle traveling state determining apparatus. In the figure, reference numeral 11 denotes a CCD camera. An image of a road surface in front of a vehicle is picked up using the camera. The image is then input to an image processing device 12. The image processing apparatus 12 has an image processing section 12a that processes the image picked up using the camera 11 and an image data storing section 12b that stores image data processed by the image processing section 12a.

The image processing device 12 is connected to the control section 13. The control section 13 is mainly composed of a microprocessor and includes zigzag rate determining means 14.

Figure 2:
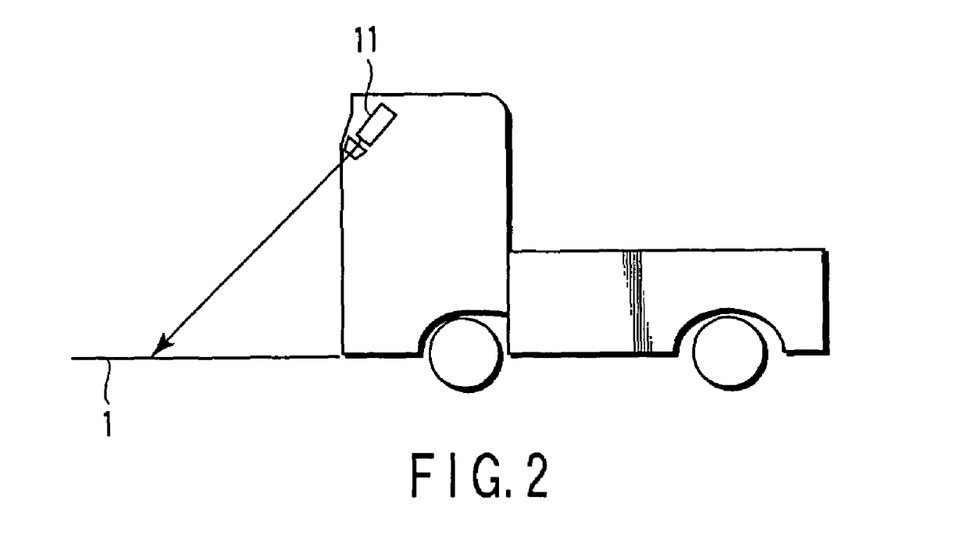
FIG. 2 is a diagram showing where a camera is mounted in the vehicle traveling state determining apparatus according to the embodiment.
Figure 5:
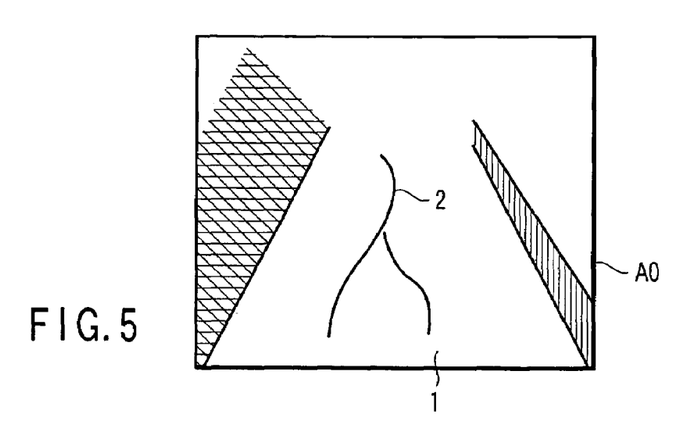
FIG. 5 is a diagram showing an image of the front of a vehicle picked up using the camera mounted in the vehicle.
Figure 6:
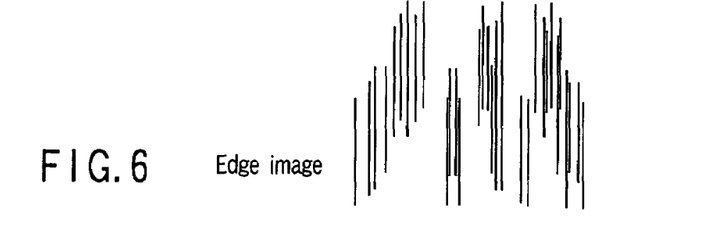
FIG. 6 is a diagram showing a gray value of an edge according to the embodiment.

The camera 11 is mounted, for example, at the top of the center of a cabin of the vehicle as shown in FIG. 2. The camera 11 picks up a road surface 1 in front of the vehicle in its traveling direction. FIG. 5 shows an image.

Figure 3:
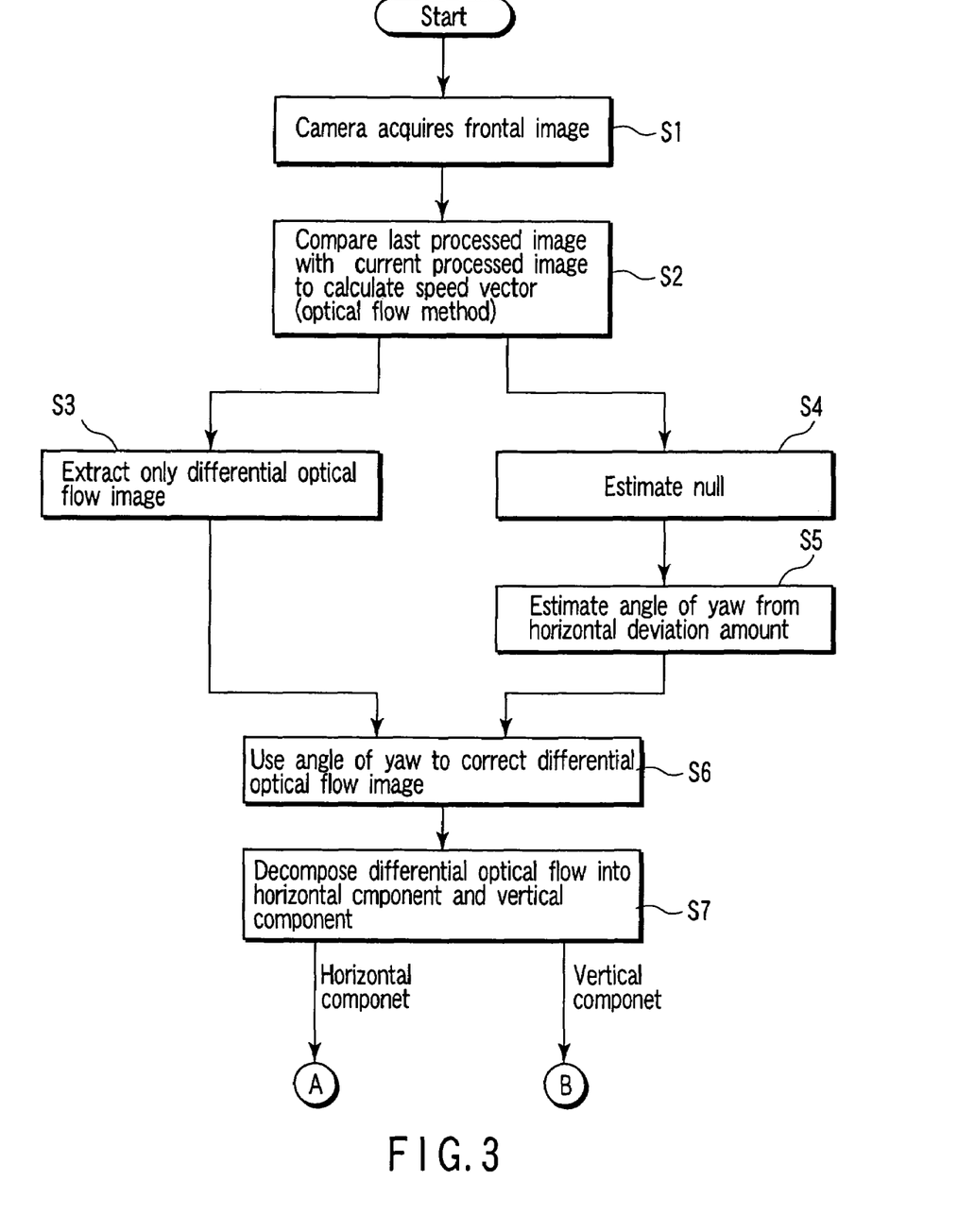
FIG. 3 is a part of a flowchart illustrating operations of the embodiment.
Figure 4:
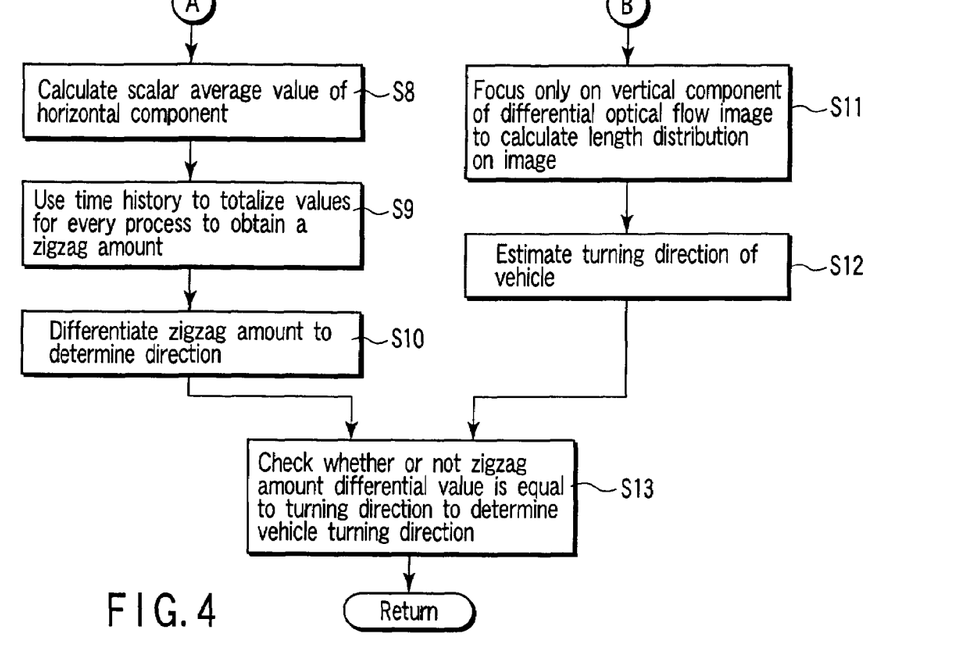
FIG. 4 is a part of a flowchart illustrating operations of the embodiment.

With reference to the flowchart in FIG. 3, description will be given of operations of an embodiment of the present invention configured as described above.

(Step S1)

First, a road surface image picked up using the camera 11 is input to the image processing device 12. The road surface image is processed and then stored in the image data storing section 12b. Then, the process shifts to step S2. In step S1, specifically, the storing process in the image data processing section 12b is executed as follows. It is assumed that no white lines are present on the opposite sides of a road surface having a crack 2 as shown in FIG. 5. First, a road surface image loaded by the camera 11 is recognized on a CCD. The CCD has a size of 512×512 pixels according to the present embodiment. The horizontal direction of the CCD is defined as an x axis direction. The vertical direction of the CCD is defined as a y direction. Then, calculation is made of a gray value on each group of pixels arranged in the x axis direction (horizontal pixel group). This calculation is executed on each of the horizontal pixel groups arranged in the y axis direction. The gray value is "0" for white and "255" for black. For intermediate colors, the gray value is determined depending on their densities. For example, the crack 2 is more blackish than the rest of the road surface. Accordingly, the crack 2 has a larger gray value than the rest of the road surface.

Then, an edge in the x axis direction is calculated from the gray value obtained. The edge is defined as a differential value of the calculated gray value. The edge is detected at a location where the color tone has changed.

Then, calculation is made of the absolute value (gray value level) of the gray value for the location where an edge has occurred. The absolute value obtained is stored in a predetermined memory for each control period. In this manner, a picked-up image is subjected to the edge process, and the processed image is stored in the image data storing section.

(Step S2)

Figure 7A:
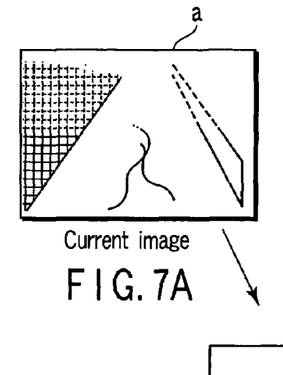
FIGS. 7A to 7C are diagrams illustrating a process for extracting an optical flow image according to the embodiment.
Figure 7B:
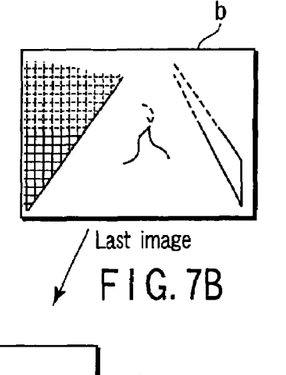
Figure 7C:
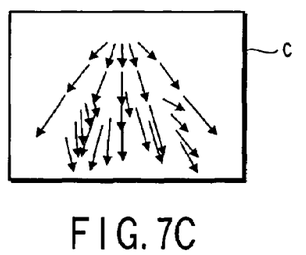

If the n-th image is to be processed, the edge of the n-th processed image is compared with the edge of the n−1-th processed image. An optical flow method is then used to calculate an optical flow in connection with each edge. The process then shifts to step S3 (see c in FIG. 7C). Here, a in FIG. 7A denotes the n-th picked-up image, and b in FIG. 7B denotes the n−1-th picked-up image.

In this case, the optical flow of an image is can be generally described as follows. It is assumed that an image of a point (x, y) on an object within a road surface image at a time t has a gray value I (x, y, t) and that the density value of a certain point does not value in spite of movement of the object. Then, the following equation is given.

$$dI/dt = 0 \quad (1)$$

The Tayler expansion is used to transform Equation (1) into Equation (2).

$$\frac{\partial I}{\partial x}\frac{dx}{dt} + \frac{\partial I}{\partial y}\frac{\partial y}{\partial t}\frac{\partial I}{\partial t} = 0. \quad (2)$$

Thus, the optical flow corresponds to a speed vector defined as (u, v) and having an x component u=dx/dt and a y component v=dy/dt. Therefore, the following equation holds true.

(Step 3)

Figure 8A:
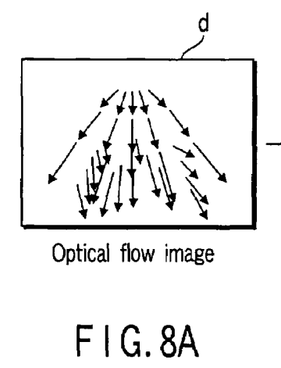
FIGS. 8A to 8C are diagrams illustrating a manner of extracting a differential optical flow image according to the embodiment.
Figure 8B:
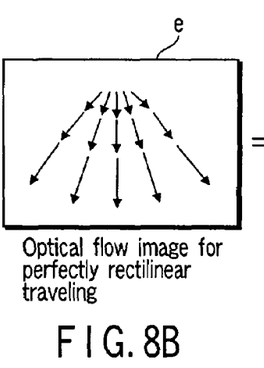
Figure 8C:
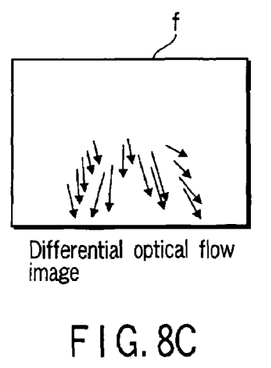
Figure 15:
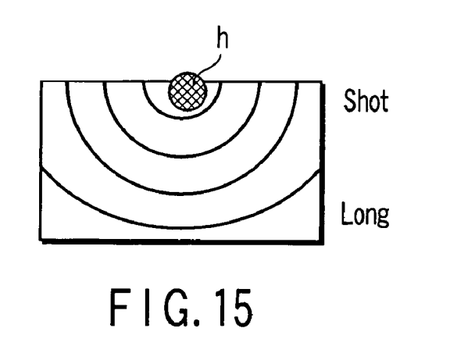
FIG. 15 is a diagram showing a length distribution of the differential optical flow image for perfectly rectilinear traveling of a vehicle according to the embodiment.

The optical flow obtained in step S2 (FIG. 8A) is compared with a rectilinear optical flow for perfectly rectilinear traveling which is separately pre-stored (FIG. 8B). A differential optical flow (FIG. 8C) is thus calculated. Here, the rectilinear optical flow can be expressed as shown at e in FIG. 8B. Optical flows of a predetermined length are evenly distributed on concentric circles around a null h (see FIG. 15).

Figure 9:
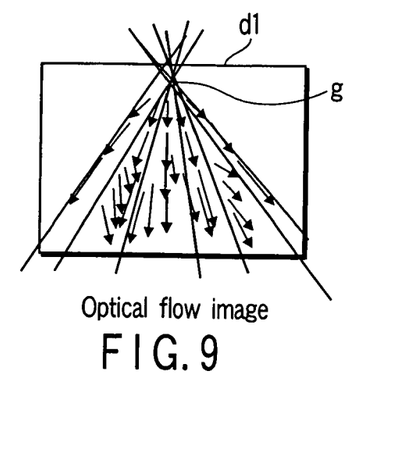
FIG. 9 is a diagram illustrating how to calculate a null according to the present embodiment.
Figure 10:
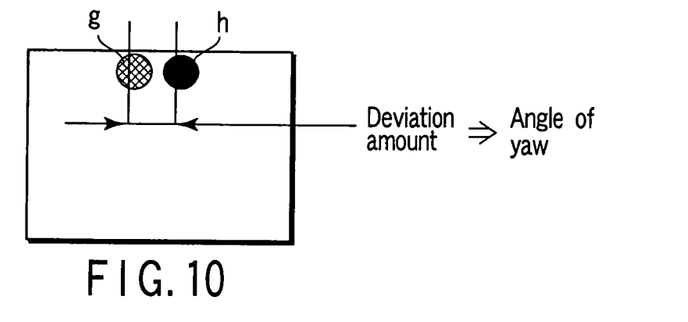
FIG. 10 is a diagram illustrating an angle of yaw according to the present invention.

Further, the null is a value determined by the position where the camera is mounted and its mounting angle (angle of depression). The null is a point that appears to be the intersection between parallel lines when the lines are viewed from obliquely above (see dl in FIG. 9). The null h of the rectilinear optical flow is pre-stored.

(Step S4)

On the other hand, a null g is estimated on the basis of the direction of the optical flow obtained in step S2.

(Step S5)

Figure 11:
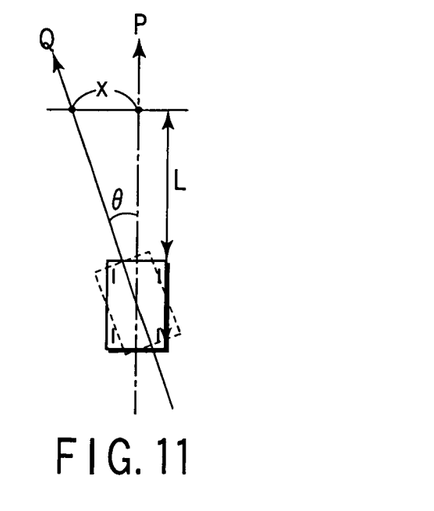
FIG. 11 is a diagram illustrating the angle of yaw according to the present invention.

Furthermore, the null h of the rectilinear optical flow is compared with the null g estimated in step S4. A deviation (deviation amount) in the x axis direction is thus calculated. Then, on the basis of the deviating position, an angle of yaw is estimated. Specifically, when for example, the steering wheel is steered to the left, the deviating position corresponds to a distance shown by x in FIG. 11. Accordingly, provided that the angle between a rectilinear line P along which the vehicle travels straight and a line Q along which the vehicle travels leftward is defined as θ, θ can be estimated using a trigonometric function on the basis of the distance x and the distance L to the image picking-up point. Then, θ corresponds to what is called the angle of yaw.

(Step S6)

Then, the differential optical flow calculated in step S3 is corrected using the angle of yaw estimated in step S5.

(Step S7)

Figure 12:
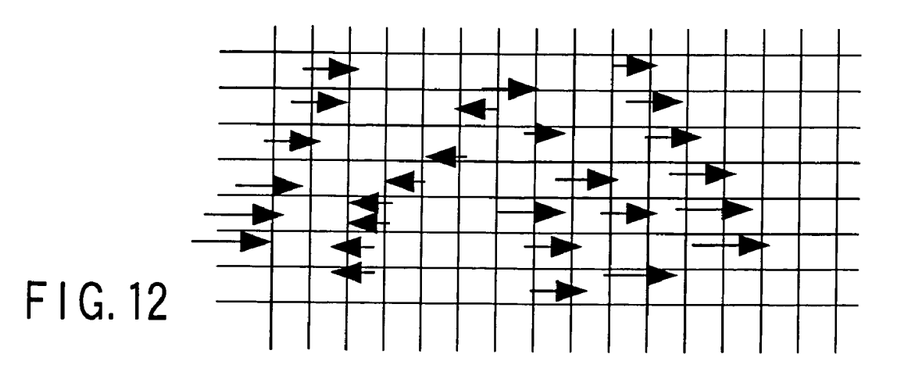
FIG. 12 is a diagram showing a horizontal component of a differential optical flow image according to the embodiment.
Figure 13:
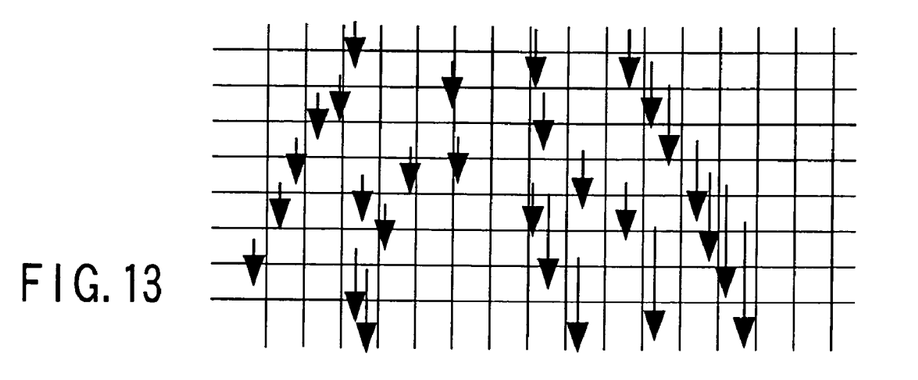
FIG. 13 is a diagram showing a vertical component of the differential optical flow image according to the embodiment.

The corrected differential optical flow is decomposed into the x axis direction (horizontal component) and the y axis direction (vertical direction) (see FIGS. 12 and 13).

(Step S8)

Then, calculation is made of the scalar average value of the horizontal component determined in step S7. This average value is a normal arithmetic average. The length of the horizontal component is used as a scalar quantity to represent the direction as the positive or negative (for example, the rightward direction is represented as the positive).

(Step S9)

Then, for every process, that is, every time step S9 is executed, a time history is used to totalize the scalar average values of the horizontal components of differential optical flows. The result is then considered to be a zigzag amount. The zigzag amount is in pixel units. Accordingly, by dividing the zigzag amount by the actual length (image resolution) of each pixel, it is possible to measure the distance of zigzag traveling on the basis of the actual length.

(Step S10)

Then, the zigzag amount calculated in step S9 is differentiated to determine the direction in which the vehicle is traveling.

(Step S11)

Figure 14:
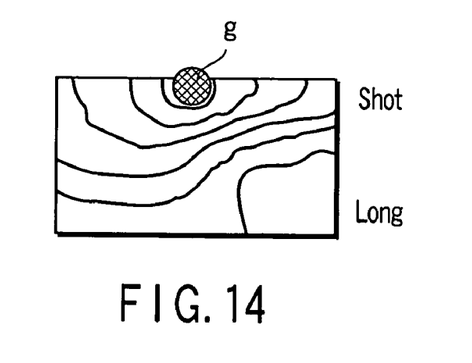
FIG. 14 is a diagram showing a length distribution of the differential optical flow image according to the embodiment.

On the other hand, determination is made of the length distribution of the optical flow vertical component obtained by the decomposition in step S7 (see FIG. 14).

(Step S12)

Then, the turning direction of the vehicle is estimated from the length distribution determined in step S11. Here, the length of the optical flow vertical component indicates the movement of an object. A smaller length indicates a lower speed, while a larger length indicates a higher speed. Consequently, the distribution enables the turning direction of the vehicle to be estimated. FIG. 13 shows an example in which a large number of longer vertical components directed rightward are distributed. This indicates that in the present embodiment, the vehicle is turning to the right.

(Step S13)

Then, the apparatus checks whether or not the differential value of the zigzag amount calculated in step S10 is equal to the turning direction estimated in step S12. Thus, the turning direction is determined. The turning direction thus determined can be utilized for, for example, traveling deviation warning apparatus (lane keeper system). This makes it possible to determine whether or not the vehicle is likely to deviate from its traveling path even if the traveling path has no white lines. When the vehicle is determined to be likely to deviate, it is possible to perform control such that a torque is applied to a steering mechanism in a direction opposite to the current steering direction.

After step S13 has been finished, the flow is ended.

Determining means may be provided to determine whether or not the zigzag amount calculated in step S9 is at at least a reference level. Then, if the result of the determination is "YES", that is, the determining means determines that the zigzag amount is at at least the reference level, the apparatus may determine that the vehicle is traveling in a zigzag line. Then, if the vehicle is determined to be traveling in a zigzag line, warning means (not shown) may give a warning to the driver.

The reference level is determined by averaging the zigzag amount for a specified time from the start of driving. That is, on the basis of the judgment that the driver does not fall asleep for the specified time from the start of driving, the zigzag amount during the specified time is averaged. Alternatively, the reference level may be experimentally preset.

Further, the image to be processed may be the lower half (for example, the range from 0 to 255 pixels if the image area has a size of 512×512 pixels) of the image picked up using the camera 11, that is, the side of the road surface image which is closer to the vehicle. This configuration enables accurate zigzag determinations with a high image resolution. It is also effective in reducing the capacity of memories used and improving image processing speed.

As described above, according to the present invention, the speed vector is calculated on the basis of the road surface image picked up using the camera. Then, on the basis of the speed vector, the apparatus determines whether or not the vehicle is traveling in a zigzag line. Consequently, the speed vector can be calculated even without any white lines on the road surface. The present invention is effective in determining whether or not the vehicle is traveling in a zigzag line even without any white lines on the road surface.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A vehicle traveling state determining apparatus comprising:

a camera which picks up an image of a road surface in a direction in which a vehicle is traveling; and zigzag state detecting section configured to determine a zigzag amount on the basis of the road surface image picked up using the camera, wherein the zigzag state detecting section is comprised of:

speed vector calculating section configured to calculate a speed vector of the road surface image by comparing a last road surface image picked up using the camera with a current road surface image picked up using the camera; and determining section configured to determine whether or not the vehicle is traveling in a zigzag line on the basis of the speed vector of the road surface image calculated by the speed vector detecting section.

2. The vehicle traveling state determining apparatus according to claim 1, wherein the zigzag state detecting section determines the zigzag amount on the basis of image data in front of the road surface image picked up using the camera.

3. The vehicle traveling state determining apparatus according to claim 1, wherein the determining section is comprised of:

calculating section configured to calculate a differential speed vector by comparing the speed vector detected by the speed vector detecting section with a speed vector for perfectly rectilinear traveling;

horizontal component value calculating section configured to determine a horizontal component value of the differential speed vector calculated by the calculating section; and zigzag amount calculating section configured to calculate the zigzag amount of the vehicle on the basis of an average value of the horizontal component value of the differential speed vector calculated by the horizontal component value calculating section, wherein the determining section determines whether or not the vehicle is traveling in a zigzag line on the basis of the zigzag amount calculated by the zigzag amount calculating section.

4. The vehicle traveling state determining apparatus according to claim 3, wherein the determining section determines that the vehicle is traveling in a zigzag line if the zigzag amount is determined to be at at least a reference level.

5. The vehicle traveling state determining apparatus according to claim 4, wherein the reference level is determined by averaging the zigzag amount for a specified time from start of driving.

6. The vehicle traveling state determining apparatus according to claim 1, wherein the zigzag state detecting section comprises edge detecting section configured to detect an edge in the picked-up road surface image, and the speed vector is calculated on the basis of a gray value of the edge.

* * * * *